United States Patent
Mita et al.

(10) Patent No.: US 11,370,582 B2
(45) Date of Patent: Jun. 28, 2022

(54) COVER, METHOD OF PRODUCING COVER, AND SECONDARY PROCESSING DIE USED FOR PRODUCING COVER

(71) Applicant: TOPPAN INC., Tokyo (JP)

(72) Inventors: Tomoko Mita, Tokyo (JP); Michihisa Yamazaki, Tokyo (JP); Ryoichi Takita, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/518,893

(22) Filed: Nov. 4, 2021

(65) Prior Publication Data

US 2022/0055802 A1     Feb. 24, 2022

Related U.S. Application Data

(63) Continuation of application No. PCT/JP2020/018669, filed on May 8, 2020.

(30) Foreign Application Priority Data

May 16, 2019   (JP) .............................. JP2019-092962

(51) Int. Cl.
   *B65D 41/18*   (2006.01)
   *B29C 33/44*   (2006.01)

(52) U.S. Cl.
   CPC .............. *B65D 41/18* (2013.01); *B29C 33/44* (2013.01)

(58) Field of Classification Search
   CPC .................................. B29C 33/44; B29C 51/34
   See application file for complete search history.

(56) References Cited

U.S. PATENT DOCUMENTS

| 2003/0111201 A1 | 6/2003 | Sato et al. |
| 2009/0152770 A1* | 6/2009 | Mikac ................. B29C 45/4421 |
| | | 425/577 |

(Continued)

FOREIGN PATENT DOCUMENTS

| JP | 2000-309363 A | 11/2000 |
| JP | 2001-026040 A | 1/2001 |

(Continued)

OTHER PUBLICATIONS

International Searching Authority, "International Search Report," issued in connection with International Patent Application No. PCT/JP2020/018669, dated Jul. 14, 2020, 7 pages.

(Continued)

*Primary Examiner* — Galen H Hauth
(74) *Attorney, Agent, or Firm* — Foley & Lardner LLP

(57) ABSTRACT

A method of forming an undercut which is engageable with an edge, on a side wall of a cover intermediate body using a cover intermediate body and a secondary processing die. In the secondary processing die, a moving inner core has, on the outer surface thereof, a concave shape corresponding to a convex shape of the inner surface of the undercut. The moving inner core is made up of a plurality of core segments which are arranged along the circumferential direction. Each core segment is vertically movable along an inclined surface of a core. When the moving inner core is moved upward, the moving inner core transforms smaller than the inner diameter of the side wall of a cover. The slide core has, on the inner surface thereof, a convex shape corresponding to the concave shape of the undercut.

3 Claims, 12 Drawing Sheets

(56) References Cited

U.S. PATENT DOCUMENTS

2013/0248481 A1    9/2013  Hoekstra et al.
2017/0021979 A1*   1/2017  Lai ........................... D21J 3/00

FOREIGN PATENT DOCUMENTS

| JP | 2001-140198 A | 5/2001 |
| JP | 4588236 B2 | 11/2010 |
| JP | 3209246 U | 3/2017 |
| JP | 2018-111538 A | 7/2018 |

OTHER PUBLICATIONS

International Searching Authority, "Written Opinion," issued in connection with International Patent Application No. PCT/018669, dated Jul. 14, 2020, 8 pages.

* cited by examiner

COVER, METHOD OF PRODUCING COVER, AND SECONDARY PROCESSING DIE USED FOR PRODUCING COVER

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2020/018669, filed on May 8, 2020, which is based upon and claims the benefit of priority to Japanese Patent Application No. 2019-092962, filed on May 16, 2019; the disclosures of which are incorporated herein by reference in their entireties.

TECHNICAL FIELD

The present invention relates to a cover made of a molded pulp product which is engageable with a paper container, a method of producing the cover, and a secondary processing die used for producing the cover.

BACKGROUND

Paper containers can be produced at high speed and at low cost. Since the paper containers are made of paper, they can be readily disposed of Paper containers are greatly advantageous in that they can be used for both low-temperature foodstuffs and warm edible foodstuffs since they are easy to fill with contents and have low thermal conductivity. A preferable way to keep the contents warm for a long time in a paper container is to cover the paper container.

For example, in PTL 1, there is proposed a cup lid which is attachable to a cup having a curl portion on the outer periphery of the top of the opening. The lid includes a panel surface, a curl portion fitting groove, a lid cut-out engaging portion, and a stacking rib portion. The panel surface covers an opening surface of the cup. The curl portion fitting groove projects edgelessly from the outer periphery of the panel surface, and has an upper portion having a substantially circular cross-sectional shape. The lid cut-out engaging portion having a flange shape is formed to project outward at an outer position on the lower part of the curl portion fitting groove. The stacking rib portion is formed to project upward from the panel surface. The curl portion fitting groove has a curl portion fitting groove opening which has a width narrower than the maximum width of the curl portion fitting groove. A fitting groove introduction portion that widens toward the lower part of the curl portion fitting groove opening is configured by the surface which extends from the curl portion fitting groove opening to the panel surface and the surface which extends from the curl portion fitting groove opening to the lid cut-out engaging portion. The fitting groove introduction portion performs a centering function when the lid is attached to the cup. The fitting groove introduction portion has an inner tapered surface, a hanging wall portion, and an outer tapered surface. The hanging wall portion has a projecting surface which vertically extends downward from the curl portion fitting groove opening. The outer tapered surface extends from the lower end of the hanging wall portion to the lid cut-out engaging portion.

The cup lid proposed here is a general cup lid formed by molding a plastic sheet that is easy to engage with. However, in the case when the cup lid is made of plastic, it is prohibited from being disposed of together with a paper cup. Therefore, it is convenient to use a cup lid made of pulp that is the same material used for making paper, to close the opening of the cup. Because then the cup can be disposed of together with the cup lid even though a little amount of the contents still remains in the cup. However, since the cover made by molding using pulp has no flexibility, when the cover is molded and then extracted from the die, if the die for the above cup lid has an undercut such as an engaging groove, the cup lid cannot be deformed and taken out since the cup lid has no flexibility like plastic. Thus, the undercut may be damaged, which may result in a failure in engaging the cover with the cup.

CITATION LIST

Patent Literature

[PTL 1] JP 4588236 B.

SUMMARY OF THE INVENTION

Technical Problem

An object of the present invention is to produce, by pulp molding, a cover which is engageable with a paper container. Another object of the present invention is to obtain a method of producing a cover that enables secure removal of the cover from the secondary processing die without damaging the shape of the undercut which is engageable with the opening of a paper container.

Solution to Problem

According to still another aspect, the present invention relates to a method of producing a cover. The method of producing a cover, having an undercut, by using a cover intermediate body and a secondary processing die. The cover intermediate body, made by pulp molding, has a top plate including a contacting portion, and a side wall extending downward from the periphery of the top plate. The secondary processing die has a core, a moving inner core and a slide core. The undercut exhibits a first convex shape on an inner surface of the side wall and a first concave shape on an outer surface of the side wall. The core of the secondary processing die has a side surface which constitutes an inclined surface which tapers toward the upper portion. The moving inner core of the secondary processing die has, on the outer surface thereof, a second concave shape corresponding to the first convex shape of the inner surface of the undercut. The moving inner core is made up of a plurality of core segments arranged along a circumferential direction of the moving inner core, which allows the moving inner core to move vertically along the inclined surface of the core. The moving inner core is configured such that when the moving inner core is moved upward, the moving inner core transforms smaller than an inner diameter of the side wall of the cover. The slide core of the secondary processing die has, on the inner surface thereof, a second convex shape corresponding to the first concave shape of the outer surface of the undercut. A method of producing a cover includes a step of placing the moving inner core on the core and positioning the side wall of the cover intermediate body between the moving inner core and the slide core; a step of pressing the side wall of the cover intermediate body using the moving inner core and the slide core to form the undercut using the second concave shape of the moving inner core and the second convex shape of the slide core, thereby completing the cover having the undercut; a step of moving the moving inner core together with the cover upward along the inclined surface of the core to decrease an outer diameter of the moving inner core to be smaller than an inner diameter of a lower portion of the cover; and a step of removing the cover from the moving inner core.

In the above production method, the slide core has the second convex shape formed on the inner surface thereof, and the moving inner core has the second concave shape formed on the outer surface thereof. The second convex shape has a surface tapering relative to a vertical direction of the slide core, and the second concave shape has a surface tapering relative to a vertical direction of the moving inner core. In the step of forming the cover, the side wall of the cover intermediate body is pressed by the tapered surface of the second convex shape and the second concave shape.

According to another aspect, the present invention relates to a secondary processing die. The secondary processing die is a die for producing a cover by providing an undercut in a cover intermediate body made of a molded pulp product. The cover intermediate body has a top plate including the contacting portion, and a side wall extending downward from the periphery of the top plate. The undercut exhibits a first convex shape on the inner surface of the side wall on the lower portion of the contacting portion and a first concave shape on the outer surface of the side wall on the lower portion of the contacting portion. The secondary processing die includes a core, a moving inner core which is made up of a plurality of core segments and located around the periphery of the core, and a slide core. The side surface of the core has an inclined surface which tapers toward the upper portion. The moving inner core has, on the outer surface thereof, a second concave shape corresponding to the first convex shape of the inner surface of the undercut. The moving inner core is vertically movable along the inclined surface of the core. Additionally, in a state where the core segments of the moving inner core are arranged along a circumferential direction, the moving inner core is configured so that when the moving inner core has been moved upward, an outer diameter of the moving inner core transforms smaller than an inner diameter of the side wall of the cover. The slide core has, on the inner surface thereof, a convex shape corresponding to the concave shape of the outer surface of the undercut. The inner diameter of the slide core arranged along the circumferential direction is smaller than the outer diameter of the undercut of the cover which is formed by pressing.

According to still another aspect, the present invention relates to a cover. The cover includes a top plate and a side wall which extends downward from the top plate. The cover is engageable with a paper container made of molded pulp, and is configured to engage with an edge of an upper end of the opening of the paper container. The side wall of the cover has an inner periphery which intermittently has convex engaging shapes or partly has a convex engaging shape. The cover may continuously have convex engaging shapes on the inner periphery of the side wall.

Advantageous Effects of the Invention

In the method of producing the cover of the present invention, a moving inner core and a slide core, which form an undercut, press the side wall of the cover to form a convex shape on the inner surface. The inner surface of the moving inner core reduces its outer diameter by utilizing the inclined surface of the core after processing and allows the cover to be removed from the secondary processing die without any difficulty. Therefore, since the secondary processing die can be produced without complicating the secondary processing die, the secondary processing die can be produced stably at low cost with high productivity.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

Figure 1A:
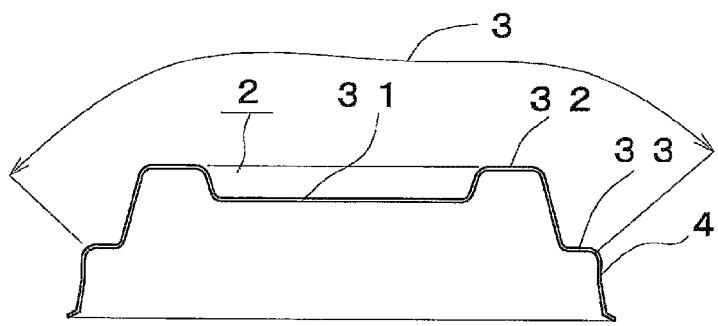
FIG. 1A is a longitudinal sectional view of a cover intermediate body before being processed into a cover according to an embodiment of the present invention.
Figure 1B:
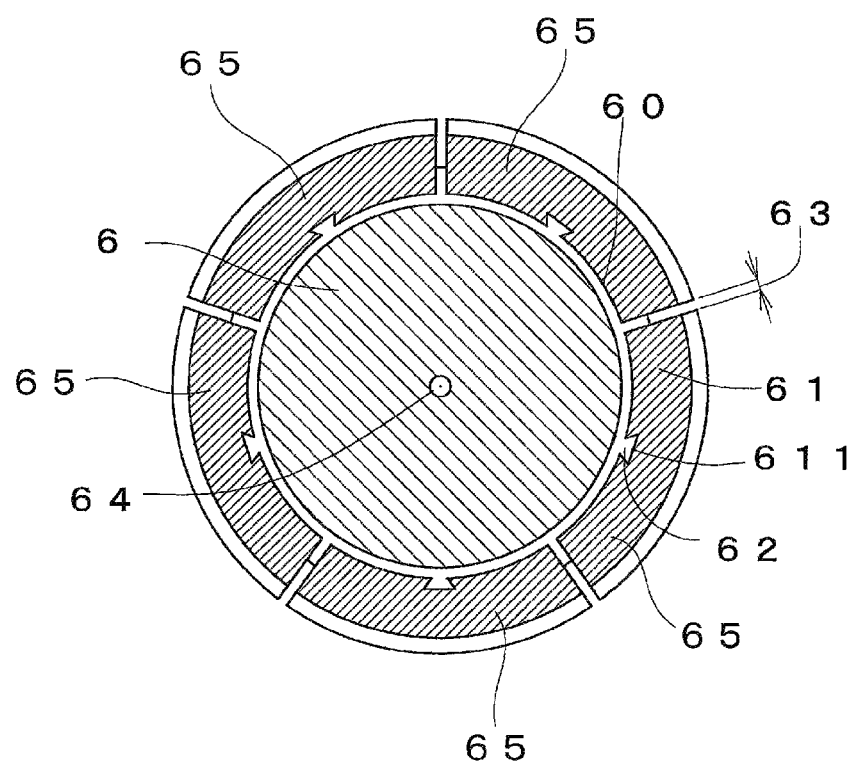
FIG. 1B is a cross-sectional view of a secondary processing die used to form an undercut in a cover intermediate body.
Figure 1C:
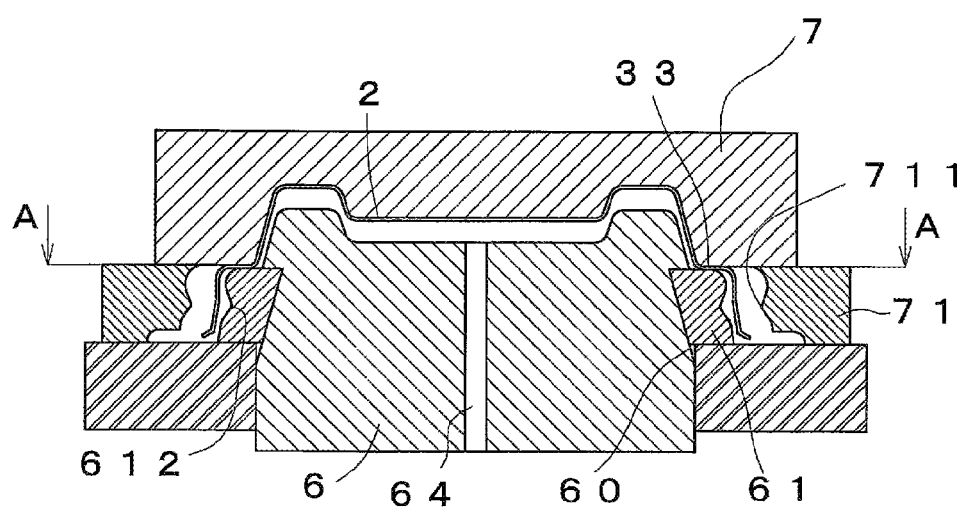
FIG. 1C is a longitudinal sectional view of the secondary processing die shown in FIG. 1B.

A method of producing the cover of the present invention will be described with reference to the drawings. FIG. 1A is a longitudinal sectional view of a cover intermediate body 2 before being processed into a cover according to an embodiment of the present invention. FIGS. 1B and 1C are a cross-sectional view and a longitudinal sectional view of a secondary processing die used for forming an undercut in a cover intermediate body 2.

The cover intermediate body 2 shown in FIG. 1A is a molded pulp product made by dissolving plant fibers, extracting the plant fibers with a wire mesh or the like, and then drying the plant fibers. Molded pulp products do not have the elasticity of molded plastic products because the fibers are three-dimensionally entangled by hydrogen bonding. However, a molded pulp product is a packaging material excellent in air permeability, water retention, shape flexibility, and is resistant to impact. However, molded pulp products have high shape-retention performance and cannot be forcibly extracted from the die like plastic. Therefore, in order to create a molded shape that includes an undercut, it is necessary to change the shape in a separate post-processing step. Therefore, the cover intermediate body 2 molded only by pulp molding is formed into a 2.5 dimensional shape with only height direction information added to the XY plane. The cover intermediate body 2 shaped with no undercuts in the vertical direction and no reverse-sloped portions, which makes it possible to remove the cover intermediate body 2 from the die in the vertical direction without resistance.

The cover intermediate body 2 used in the present embodiment has a top plate 3 and a side wall 4 extending downward from the periphery of the top plate 3 as shown in FIG. 1A. A contacting portion 33 which is in contact with an edge 511 of an upper end of an opening of the paper container 5 (see FIG. 5) is formed close to the periphery of the top plate 3 adjacent to the side wall 4 of the cover intermediate body 2. A depressed portion 31 which is depressed inward is formed in the center of the top plate 3. The depressed portion 31 may have a hole into which a straw or the like can be inserted. Even when the liquid condensed from the contents or its vapor adheres to the inner surface of the top plate 3, the shape of the depressed portion 31 helps the adhered liquid to easily return to the inside of the paper container 5 without any problem. In order to obtain the depressed portion 31, a high bank portion 32 shaped like a somma is provided around the center of the cover. The high bank portion 32 is designed in such a shape that the depressed portion 31 can surely secure a position of the depressed portion 31 away from the contents. The bank portion 32 is formed in a circumferential shape.

The contacting portion 33 is provided at a periphery end portion of the top plate 3. The side wall 4 extends downward from the outer edge of the contacting portion 33. The side wall 4 which extends downward in the cover intermediate body 2 extends vertically downward or is inclined outward in the downward direction. The cover intermediate body forming die for producing the cover intermediate body 2 has no undercut, and thus the cover intermediate body 2 can be extracted from the cover intermediate body forming die without being forcibly extracted.

Figure 6A:
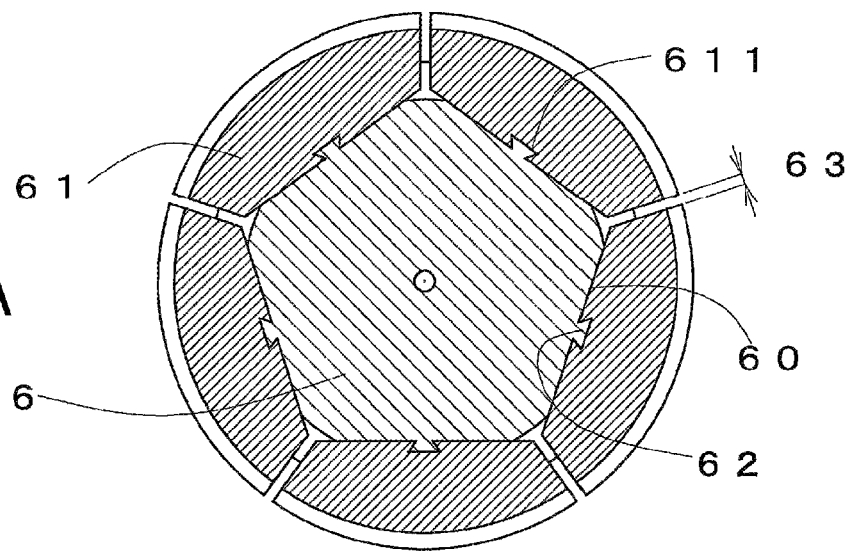
FIGS. 6A and 6B are cross-sectional views showing an example of another embodiment of a secondary processing die used for forming an undercut in a cover intermediate body, in a cover according to an embodiment of the present invention.
Figure 6B:
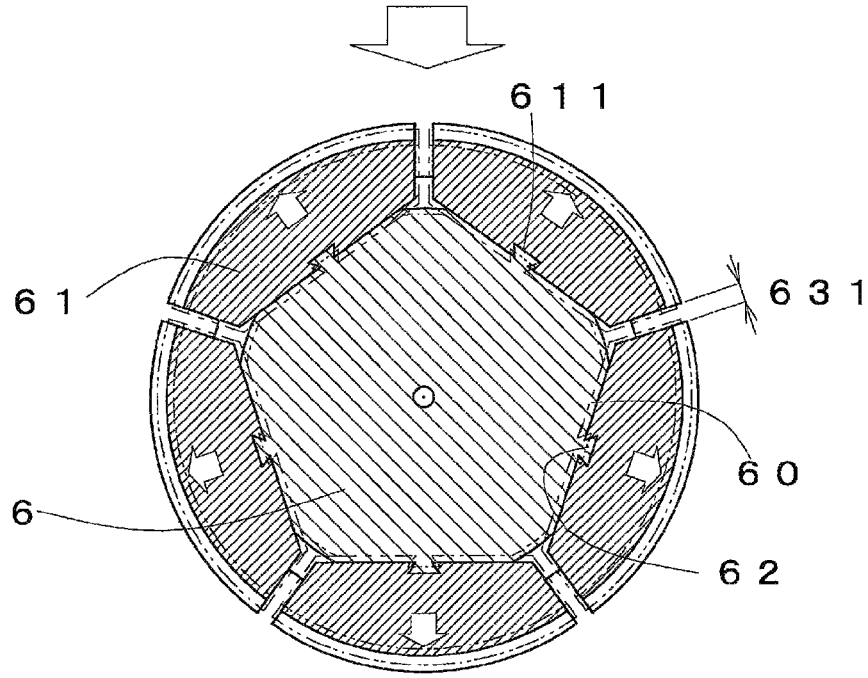

FIGS. 1B and 1C are a cross-sectional view and a longitudinal sectional view of a secondary processing die for secondary processing a cover intermediate body 2 into a cover that is engageable with a paper container 5. FIG. 1B is a cross-sectional view of a core 6 and a moving inner core 61 surrounding the core 6 in the plane A-A of FIG. 1C. In this example, although the moving inner core 61 is made up of five core segments arranged along a circumferential direction of the core, the moving inner core 61 may be made up of at least two core segments or more, or may preferably be made up of three core segments or more. Guide grooves 611 are arranged on the inner surface of each core segment 65 of the moving inner core 61. Because each guide protrusion 62 provided along the inclined surface of the core 6 is fitted into each guide groove 611, each core segment 65 of the moving inner core 61 is configured to be slidable without slipping out from the inclined surface of the core 6. As shown in FIG. 1B, the inclined surface of each core segment 65 of the moving inner core 61 may have a circular arc shape that forms a side surface having a cylindrical shape when the core segments 65 are aligned, or may be an inclined surface as shown in FIGS. 6A and 6B. A flat inclined surface enables easy core processing, easy polishing, and easy processing due to smoother sliding. The inclined surface of the core 6 is configured to taper towards the upper portion.

FIG. 1C is a longitudinal sectional view showing a state of a cover intermediate body 2 which is held by a core 6 and a cavity 7 after inserting a cover intermediate body 2 into the core 6 side when the core 6 and the cavity 7 are in the open position, followed by closing the cavity 7. The moving inner core 61 is arranged on the outer periphery of the core 6. The moving inner core 61 is located on the upper portion of the inclined surface 60 of the core 6. The outer surface of the moving inner core 61 is away from the inner surface of the side wall 4 of the cover intermediate body 2. The contacting portion 33 of the cover intermediate body 2 is in contact with the upper end of the moving inner core 61 described above. The inner surface of the slide core 71 is also away from the outer surface of the side wall 4 of the cover intermediate body 2. The moving inner core 61 has, on the outer surface thereof, a concave shape 612 corresponding to a convex shape 41 (see FIG. 2A) on the inner surface of the cover 1. The slide core 71 has, on the inner surface thereof, a convex shape 711 corresponding to a concave shape 42 (see FIG. 2A) of the outer surface of the undercut. The slide core 71 has the convex shape 711 formed on the inner surface thereof, and the moving inner core 61 has the concave shape 612 formed on the outer surface thereof. The convex shape 711 preferably has a surface tapering relative to a vertical direction of the slide core 71, and the concave shape 612 preferably has a surface tapering relative to a vertical direction of the moving inner core 61. The tapered shape enables the side wall 4 to change its shape smoothly without breaking, and enables stable formation of an undercut. The tapered shape enables the cover 1 to easily engage with the paper container 5. The concave shape 612 of the moving inner core 61 and the convex shape 711 of the slide core 71 may be formed continuously along the circumferential direction, or may be formed intermittently or partially.

Figure 2A:
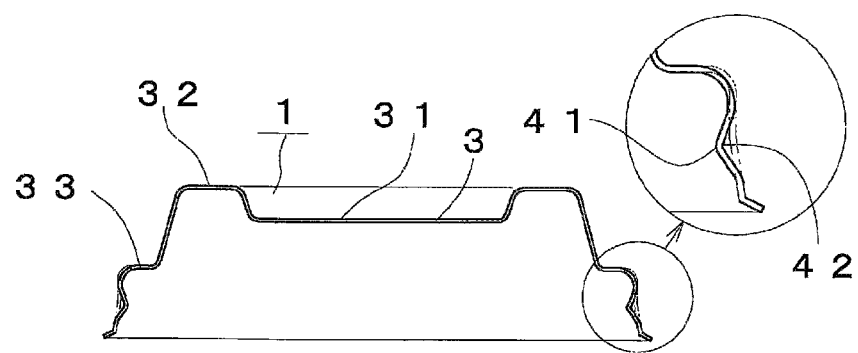
FIG. 2A is a longitudinal sectional view of a secondary processed cover according to an embodiment of the present.
Figure 2B:
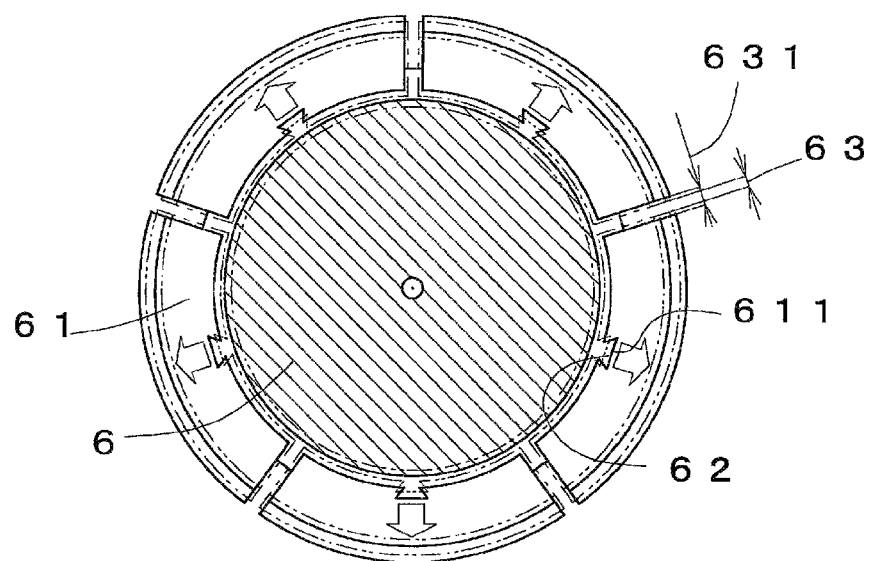
FIG. 2B is a cross-sectional view showing a state in which a cover intermediate body is pressed by a secondary processing die into a cover.
Figure 2C:
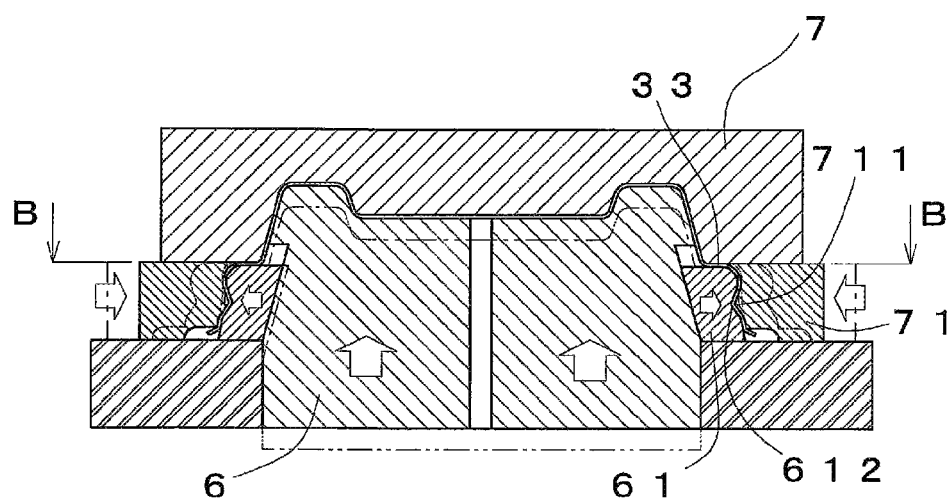
FIG. 2C is a longitudinal sectional view showing a state in which a cover intermediate body is pressed by a secondary processing die into a cover.

FIG. 2A is a longitudinal sectional view of a secondary processed cover 1, in a cover 1 according to an embodiment of the present invention. FIGS. 2B and 2C are a cross-sectional view and a longitudinal sectional view showing a state in which a cover intermediate body 2 is pressed by a secondary processing die into a cover 1. FIG. 2A shows the cover 1 which has been secondary processed, in which the side wall 4 of the cover intermediate body 2 is processed to produce an intermittent or partially convex engaging shape on the inner surface of the side wall 4.

Figure 5:
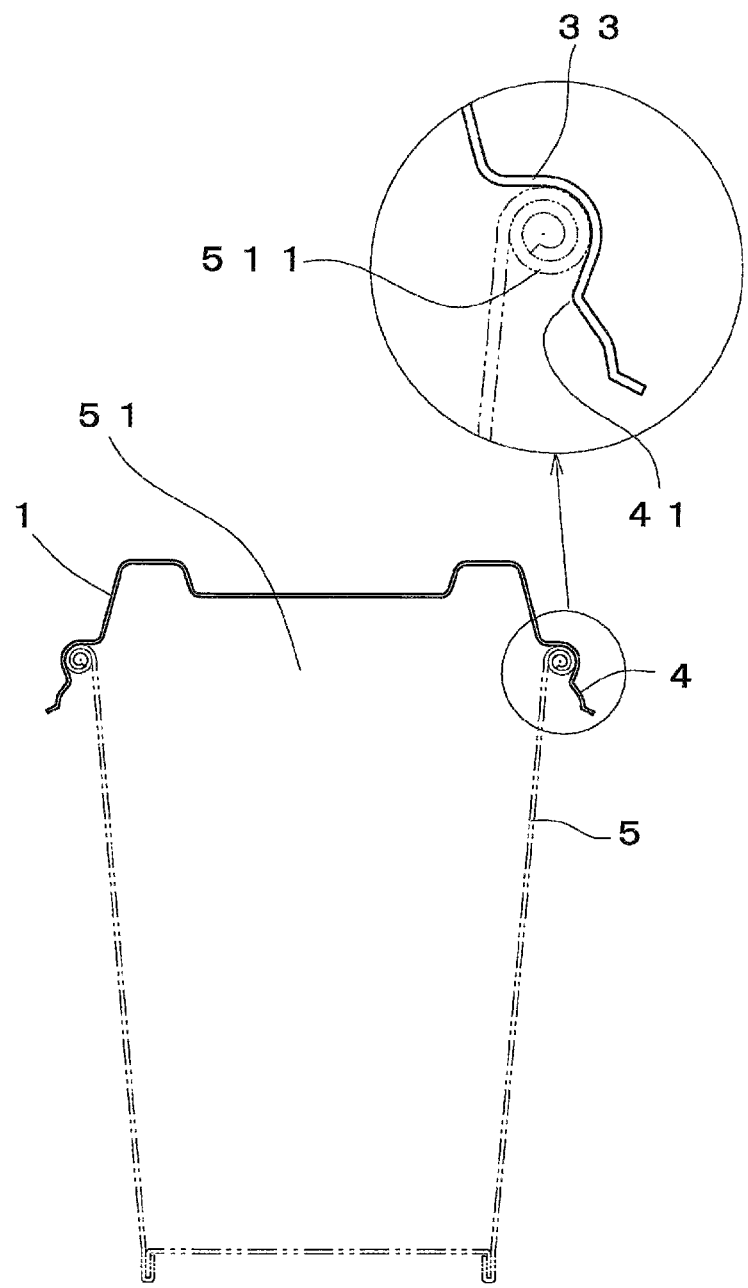
FIG. 5 is a longitudinal sectional view showing a state in which a cover according to an embodiment of the present invention is engaged with a paper container.

As shown in the longitudinal sectional view in FIG. 5, the side wall 4 of the cover 1 is engaged with the opening 51 of the paper container 5. The contacting portion 33 is in contact with the upper end of the opening 51 of the paper container 5. The convex shape 41 on the inner surface of the undercut formed on the side wall 4 of the cover 1 engages with a portion of the edge 511 of the upper end of the opening 51 which is located close to the lower edge of the edge 511 of the upper end. The cover 1 engages with the periphery of the opening 51 of the paper container 5 and covers and protects the opening 51.

As shown in FIG. 2B, in the secondary processing of the cover 1, the core 6 is pushed upward, and each core segment 65 of the moving inner core 61 slides outward along each guide protrusion 62 and each guide groove 611 by a distance corresponding to the height at which the core is raised and the inclination angle of the inclined surface. The guide protrusion 62 is formed on the inclined surface of the core 6. The guide groove 611 is formed on the inner surface of the moving inner core 61. Each core segment 65 of the moving inner core 61 cannot move upward because the upper end of each core segment 65 is in contact with the contacting portion 33 of the cover intermediate body 2, and a contacting surface of the cavity 7. Therefore, as the core 6 is pushed in the upward direction, the outer diameter of the inclined surface 60 which is in contact with the inner surface of each core segment 65 of the moving inner core 61 increases. As the core 6 moves upward, each core segment 65 of the moving inner core 61 slides outward. Meanwhile, the slide core 71 is pushed inward from the outside by a hydraulic cylinder, a cylinder using compressed air, an angular pin, an inclined pin, or the like.

In order to form an undercut, the moving inner core 61 has, on the outer surface thereof, the concave shape 612 corresponding to the convex shape 41 on the inner surface, and the slide core 71 has, on the inner surface thereof, the convex shape 711 corresponding to the concave shape 42 of the outer surface of the undercut. The side wall 4 of the cover 1, made of a molded pulp product, is press-molded into the convex shape 41 on the inner surface of the side wall 4 by being sandwiched by the concave shape 612 of the moving inner core 61 and the convex shape 711 of the slide core 71.

Because the moving inner core 61 is made up of a plurality of core segments 65, and is vertically movable along the inclined surface, and changes the outer diameter of the combined moving inner core, a gap 63 increases between each core segment 65 of the moving inner core 61 and becomes a large gap 631. An unprocessed portion where no undercut processing is performed is generated in the vicinity of the gap 63 located between each core segment 65 of the moving inner core 61. Therefore, it is possible to obtain a cover having an intermittently or partially convex engaging shape on the inner periphery of the side wall of the lid cover. By having an unprocessed portion where no undercut processing is performed, such a cover is easy to change its shape by twisting the side wall 4 of the cover 1 where an unprocessed portion is formed. This is advantageous in that the cover 1 can be easily engaged with or removed from the opening of the paper container 5.

Figure 3A:
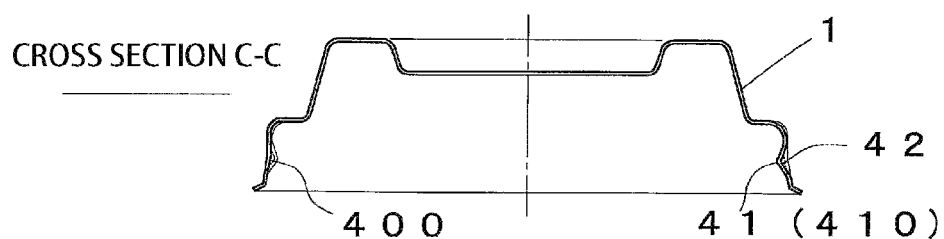
FIG. 3A is a longitudinal sectional view showing an example of the shape of an undercut of a cover according to an embodiment of the present invention.
Figure 3B:
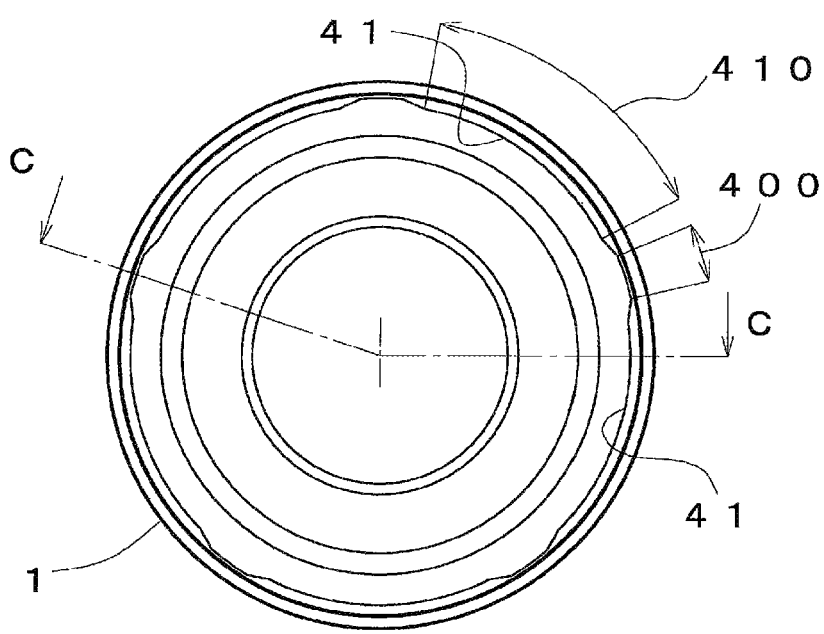
FIG. 3B is a bottom view of the cover shown in FIG. 3A.

FIGS. 3A and 3B are a longitudinal sectional view and a bottom view showing an example of the shape of an undercut of a cover 1 according to an embodiment of the present invention. FIG. 3A shows a cross-sectional view in which a convex shape 41 of an undercut is formed on the inner surface of a right side wall 4. However, the side wall 4 on the left still has an unprocessed portion 400 which indicates that an undercut is not formed.

FIG. 3B is a bottom view of a cover 1, and shows an example in which an undercut convex shape 41 is formed having a large width. In the example shown in FIG. 3B, a convex portion 410 is divided by the unprocessed portions 400 generated between each core segment of the moving inner core. By having the divided configuration of the convex portion 410, the cover 1 can be easily engaged with the opening 51 of the paper container 5. Because when placing the cover 1 on the opening 51 of the paper container 5, and applying the pressure from above, the side wall 4 of the unprocessed portion 400 is easily deformed, and thus the convex portion 410 can smoothly slide over the edge 511 of the paper container 5.

Figure 3C:
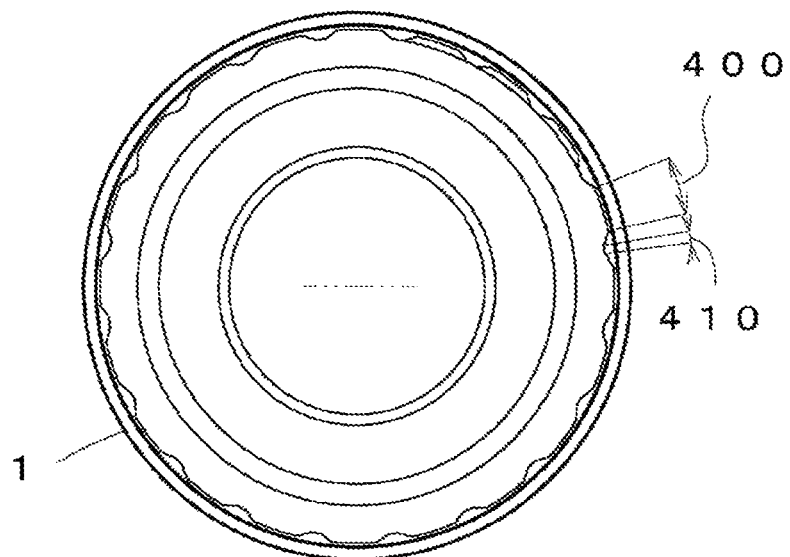
FIG. 3C is a bottom view showing an example of a shape of an undercut in a cover according to another embodiment.

FIG. 3C is a bottom view of the cover 1, which illustrates an example in which a large number of convex shapes 41 of undercuts having a narrow width are formed. In the example shown in FIG. 3C, a large number of the unprocessed portions 400 are formed between each core segment of the moving inner core, and the convex portions 410 are also distributed to form a cover that is easy to engage with the paper container 5.

In FIGS. 3B and 3C, the undercut portion includes the convex portion 410 and the unprocessed portion 400. However, it is also possible to form the cover 1 with an undercut formed only by the convex portions 410 where no unprocessed portion 400 is formed at the periphery, and where the convex portions 410 is formed continuously over the entire circumference. Such an undercut is obtained by removing the cover 1 in FIG. 3B once from the die, and rotating the cover 1 so that each core segment 65 of the moving inner core 61 having a convex shape is placed on the unprocessed portion 400, and once again pressing the cover 1. Through the above process, a cover having a large engaging force and a high sealing property is obtained.

Figure 4A:
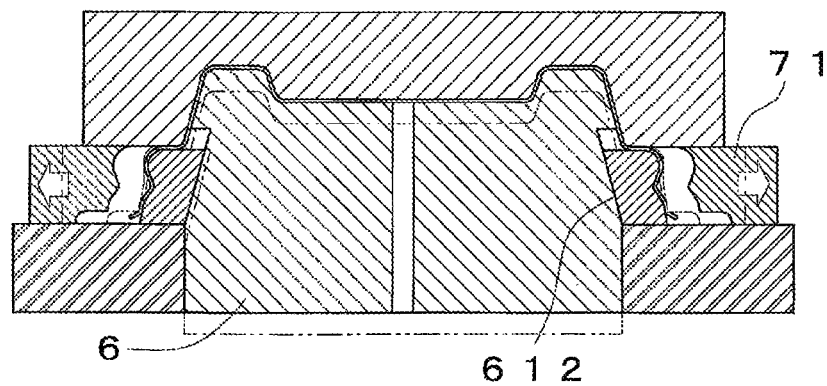
FIGS. 4A to 4C are longitudinal sectional views illustrating a sequence of steps in which a cover according to an embodiment of the present invention which has been secondary processed is extracted.
Figure 4B:
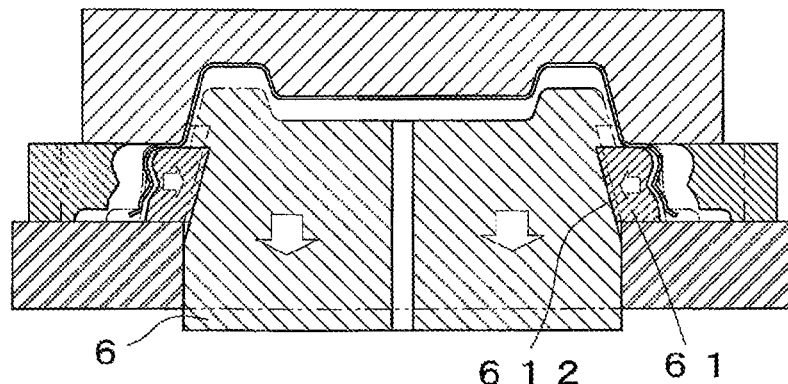
Figure 4C:
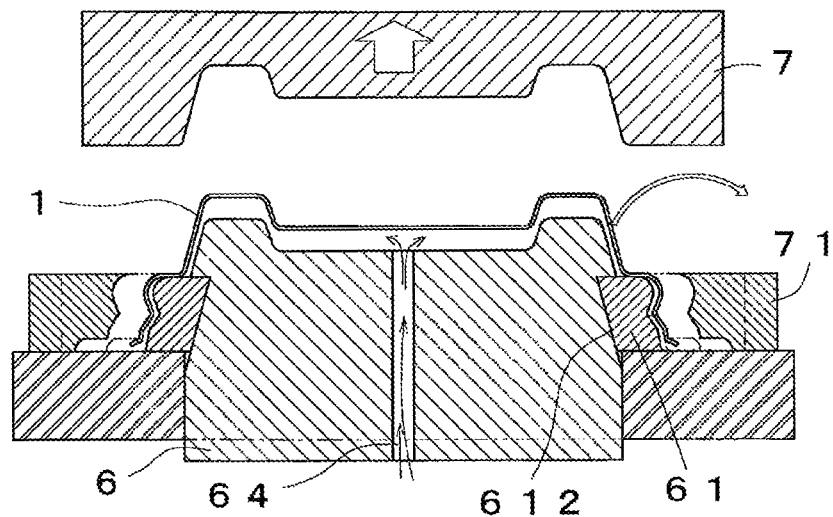

FIGS. 4A to 4C are longitudinal sectional views which illustrate a sequence of steps for extracting the secondary processed cover 1, in a cover 1 of an embodiment of the present invention. In the step shown in FIG. 4A, the slide core 71 is moved outward to free the outer surface of the undercut. The slide core 71 is moved by a general method such as by using a hydraulic cylinder, a pneumatic cylinder, an inclined pin, an angular pin, a finger pin, or an inclined pin.

In FIG. 4B, the core 6 is moved downward, and the guide protrusion 62 fitted into the guide groove 611 of the moving inner core 61 shown in FIG. 2B is also moved downward. However, the moving inner core 61 has, on the lower surface thereof, a caul plate and thus cannot move downward. Therefore, the moving inner core 61 slides on the guide protrusion 62 by the guide groove 611 shown in FIG. 2B, and moves inward along the inclination of the inclined surface 60 on which the guide protrusion 62 is formed. By moving the core 6 downward, the moving inner core 61 moves inward which causes the moving inner core 61 to be separated from the convex portion 410 of the cover 1, resulting in the undercut to be separated from the die.

In FIG. 4C, when the cavity 7 is raised, the contacting portion 33 of the cover 1 becomes free and compressed air or the like is ejected from an outlet 64 located in the center of the core 6, enabling the cover 1 to be removed from the die. Instead of using the outlet 64, an ejector pin may be used for ejection.

In the production method of the cover according to the present embodiment, the moving inner core 61 and the slide core 71, which form an undercut, press the side wall 4 of the cover 1 to form the convex shape 41 on the inner surface. After the above process, the cover 1 can be removed from the secondary processing die without difficulty, by having the outer diameter of the moving inner core 61 located on the inner side to be smaller than the inner diameter of the lower portion of the side wall 4 of the cover 1 by utilizing the inclined surface of the core 6. Therefore, since the cover 1 can be produced without complicating the die, the cover 1 can be stably produced at low cost, with high productivity. Further, because the cover 1 according to the present embodiment is made in a state in which pulp fibers are three-dimensionally entangled, the cover 1 has excellent breathability, water retentivity, and shape flexibility. In addition, since the cover 1 is made of pulp, the ashes and gases from burning the cover 1 will not pollute the air, and in a case when the body of the paper container 5 to be engaged with the cover 1 is made of paper, the paper container 5 can be disposed of together with the cover 1. Further, because there is no need to use harmful chemicals in a large amount of water for molding the cover 1, there is almost no burden on the natural environment, and it is easy to reuse the cover 1 as a resource, thus it is possible to utilize the cover 1 without losing the environmental benefit of the molded pulp until the cover 1 is finally returned to the soil.

INDUSTRIAL APPLICABILITY

The present invention is applicable to a cover which engages with a paper container, a method of producing the cover, and a secondary processing die used for producing the cover.

REFERENCE SIGNS LIST

1 . . . cover; 2 . . . cover intermediate body; 3 . . . top plate; 31 . . . depressed portion; 32 . . . bank portion; 33 . . . contacting portion; 11 . . . side wall; 400 . . . unprocessed portion; 41 . . . convex shape; 410 . . . convex portion; 42 . . . concave shape; 5 . . . paper container; 51 . . . opening; 511 . . . edge; 6 . . . core; 60 . . . inclined surface; 61 . . . moving inner core; 611 . . . guide groove; 612 . . . concave shape; 62 . . . guide protrusion; 63 . . . gap; 631 . . . large gap; 64 . . . outlet; 7 . . . cavity; 71 . . . slide core; 711 . . . convex shape.

What is claimed is:

1. A method of producing a cover, having an undercut, by using a cover intermediate body and a secondary processing die,
    the cover intermediate body, made by pulp molding, having
    a top plate including a contacting portion, and
    a side wall extending downward from a periphery of the top plate, and
    the secondary processing die having
    a core,
    a moving inner core, and
    a slide core,
    the undercut exhibiting a first convex shape on an inner surface of the side wall and a first concave shape on an outer surface of the side wall,
    the core having a side surface in a form of an inclined surface which tapers toward a top of the core, and
    the moving inner core having, on an outer surface thereof, a second concave shape corresponding to the first convex shape of the inner surface of the undercut, and
    the moving inner core being made up of a plurality of core segments arranged along a circumferential direction of the moving inner core, which allows the moving inner core to move vertically along the inclined surface of the core, when the moving inner core has been moved upward, the moving inner core transforms smaller than an inner diameter of the side wall of the cover, and
    the slide core has, on an inner surface thereof, a second convex shape corresponding to the first concave shape of the outer surface of the undercut,
    the method comprising the steps of:
    a step of placing the moving inner core on the core and positioning the side wall of the cover intermediate body between the moving inner core and the slide core;
    a step of pressing the side wall of the cover intermediate body using the moving inner core and the slide core to form the undercut using the second concave shape of the moving inner core and the second convex shape of the slide core, thereby completing the cover having the undercut;
    a step of moving the moving inner core together with the cover upward along the inclined surface of the core to decrease an outer diameter of the moving inner core to be smaller than an inner diameter of a lower portion of the cover; and
    a step of removing the cover from the moving inner core.

2. The method of producing a cover of claim 1, wherein the slide core has the second convex shape formed on the inner surface thereof, the moving inner core having the second concave shape formed on the outer surface thereof, the second convex shape having a surface tapering relative to a vertical direction of the slide core, the second concave shape having a surface tapering relative to a vertical direction of the moving inner core, and
    in the step of forming the cover, the side wall of the cover intermediate body is pressed by the tapered surface of the second convex shape and the second concave shape.

3. A secondary processing die for producing a cover by providing an undercut in a cover intermediate body made of a molded pulp product, the cover intermediate body having a top plate including a contacting portion, and a side wall extending downward from a periphery of the top plate, the undercut exhibiting a first convex shape on an inner surface of the side wall on a lower portion of the contacting portion and a first concave shape on an outer surface of the side wall on the lower portion of the contacting portion,
    the secondary processing die, comprising:
    a core;
    a moving inner core being made up of a plurality of portions arranged along a circumferential direction; and
    a slide core, wherein
    the core has a side surface in a form of inclined surface which tapers toward a top of the core,
    the moving inner core has, on an outer surface thereof, a second concave shape corresponding to the first convex shape of the inner surface of the undercut, the moving inner core being vertically movable along the inclined surface of the core,
    in a state where core segments of the moving inner core are arranged along a circumferential direction, the moving inner core is configured so that when the moving inner core has been moved upward, an outer diameter of the moving inner core transforms smaller than an inner diameter of the side wall of the cover, the slide core has, on an inner surface thereof, a second convex shape corresponding to the first concave shape of the outer surface of the undercut, and an inner diameter of the slide core arranged along a circumferential direction is smaller than an outer diameter of the undercut of the cover formed by pressing.

* * * * *